March 31, 1959 R. B. DOME 2,880,269
CONTROLLABLE TRAP CIRCUIT FOR INTERCARRIER SOUND TELEVISION RECEIVER
Filed Feb. 24. 1953
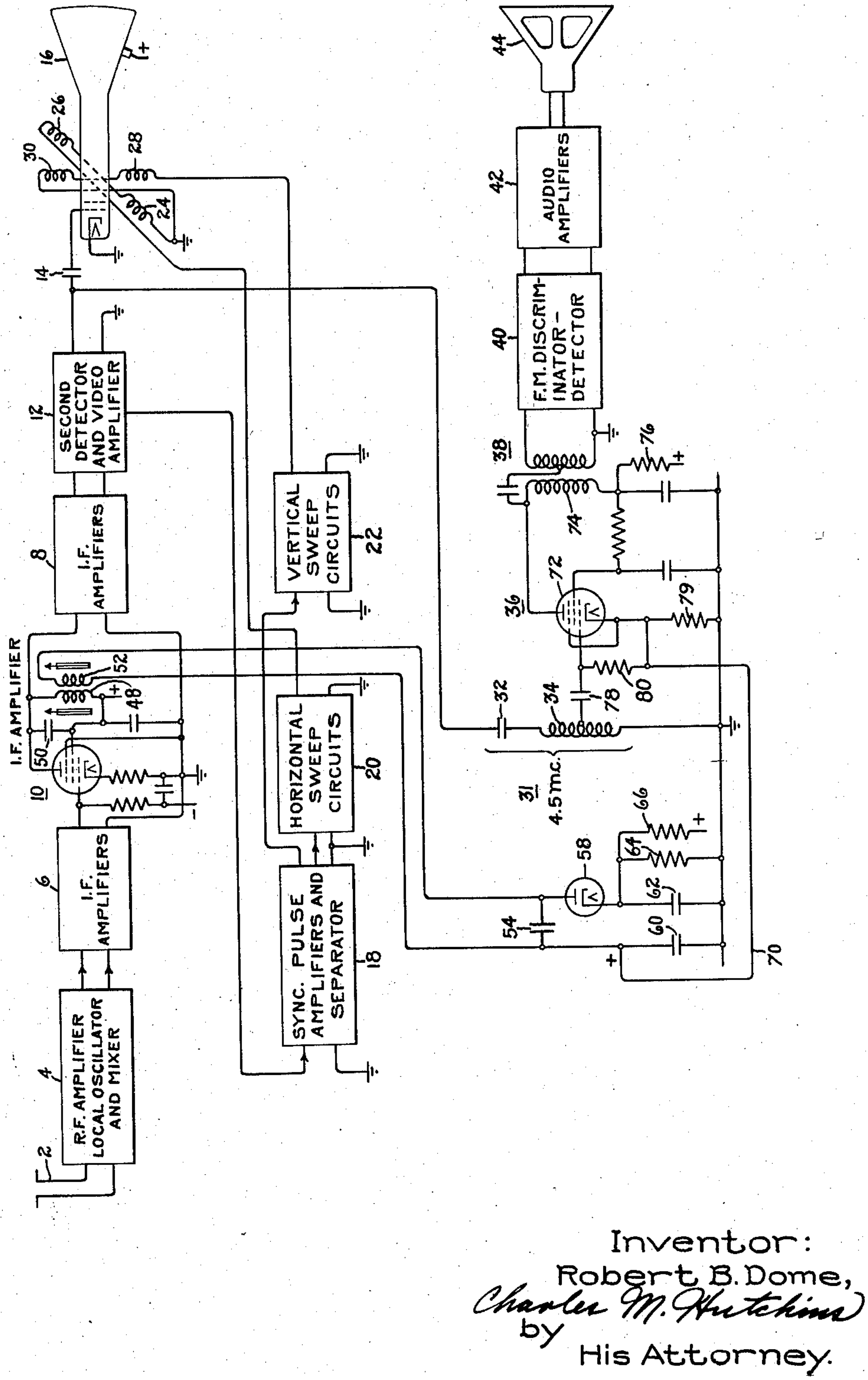
Inventor:
Robert B. Dome,
by Charles M. Hutchins
His Attorney.

United States Patent Office 2,880,269

Patented Mar. 31, 1959

2,880,269

CONTROLLABLE TRAP CIRCUIT FOR INTERCARRIER SOUND TELEVISION RECEIVER

Robert B. Dome, Geddes Township, Onondaga County, N.Y., assignor to General Electric Company, a corporation of New York Application February 24, 1953, Serial No. 338,195

5 Claims. (Cl. 178—5.8)

This invention relates to improvements in intercarrier sound television receivers whereby the amount of audio signal in the video channel is minimized.

In television receivers having separate intermediate frequency channels for the video and audio carriers and separate detectors for each channel, the amount of audio carrier that appears in the video channel can easily be attenuated by a factor of the order of one hundred to one so that the amount of the audio carrier arriving at the detector at the end of the video carrier channel is negligible. However, in television receivers of the intercarrier sound type, for example, as disclosed in U.S. Patent No. 2,448,908, granted Sept. 7, 1948, to Louis W. Parker, the audio and video carriers pass through common intermediate frequency amplifiers before reaching a common detector that supplies signals to video channel amplifiers as well as to means for reproducing the audio intelligence. Hence, any attenuation of this sound carrier in the common amplifiers also attenuates the amount of audio energy available, and an attenuation in the order of one hundred to one is, therefore, impracticable. For this and other reasons set forth in the aforesaid U.S. Patent 2,448,908, the sound and video carriers are generally amplified by the common amplifier in such manner that the sound carrier level is approximately reduced one-twentieth of the video carrier level.

In general, the signals radiated by a transmitter are such that the amplitude of the sound carrier is about seventy percent of the peak amplitude of the video carrier, but there are variations in this proportion. Then, too, the sound and video carriers may be attenuated by different amounts in passing through the atmosphere from the transmitter to the receiver. It has been the practice to obtain the desired ratio between the video and sound carrier at the second detector of an intercarrier sound receiver by using a passive attenuating network in the amplifiers preceding the detector. However, if such a network is adjusted for proper operation when the sound carrier arriving at the receiver is relatively weak, the adjustment will not be proper when the sound carrier arriving at the receiver is relatively strong. Under these circumstances the amount of attenuation of the sound carrier is insufficient and the amount of sound signal introduced from the detector to the video channel may be such as to distort the image produced from the signals in the video channel.

Accordingly, it is the object of this invention to provide simple and inexpensive means whereby the strength of the sound carrier at the second detector is automatically controlled so as to accommodate variations in the relative strengths of the received sound and video carriers and thus to permit the amount of sound intermediate frequency carriers to be maintained at such a low relative value as not to introduce distortion signals into the video channel.

This objective may be attained by controlling the amount of attenuation afforded the sound carrier in the circuits preceding the detector in accordance with the amplitude of the beat frequency between the sound and video carriers.

The details of one way of providing such control of the attenuation in accordance with the invention may be understood after a consideration of the following description and the accompanying drawing, which is a circuit diagram, partly in simplified block form, of a television receiver embodying the invention.

The following portions of the description relate to the standard components of an intercarrier sound television receiver and it is to be understood that alterations of these components may be made without involving the present invention. The radiated sound and video carriers and their sidebands are picked up by an antenna 2, amplified by a radio frequency amplifier, and reduced to intermediate frequencies by a mixer and local oscillator, the latter three components being included in the rectangle 4. These intermediate frequencies are amplified by an intermediate frequency amplifier that may include a plurality of stages, some being indicated by the numeral 6 and others being indicated by the numeral 8. For reasons well understood by those skilled in the art, the various stages of the intermediate frequency amplifier are generally tuned so as to amplify different frequency ranges of a spectrum including the sound and video carriers at the intermediate frequency level. One of these amplification stages, generally indicated by the numeral 10, is usually tuned so as to selectively amplify a region of frequencies including the sound carrier, and the means for attenuating the sound carrier may be coupled to the stage. It will be realized that the stage 10 may be an intermediate stage as shown, or that it may be any stage of the intermediate frequency amplifier as far as the present invention is concerned.

In a customary manner, the output of the last stage of the intermediate frequency amplifier is applied to a second detector followed by a video amplifier, here shown as being included in a rectangle 12. The output of the video amplifier is shown as being coupled by a condenser 14 to an electrode of a picture-reproducing device 16 that controls the intensity of the cathode ray beam that is directed toward a phosphor-coated surface (not shown) of the picture-reproducing device. The entire video signal is also applied to a synchronizing signal separator and synchronizing pulse amplifier indicated by the numeral 18, and the synchronizing pulses thus provided are coupled to a horizontal sweep circuit 20 and to a vertical sweep circuit 22 in any desired manner. The sweep wave supplied by the horizontal sweep circuit 20 is coupled to horizontal deflection coils 24 and 26, and the sweep wave supplied by the vertical sweep circuit 22 is coupled to vertical deflection coils 28 and 30. The electromagnetic fields set up by these deflection coils thus cause the cathode ray beam of the picture reproducing device 16 to scan a raster on the phosphor surface, in a manner well known to those skilled in the art.

In intercarrier sound receivers, the audio information is derived from the beat frequency between the video and sound carriers that appears at the output of the second detector. Under present standards of television transmission, the beat frequency is 4.5 megacycles. This beat frequency may be extracted from the output of the second detector by a tuned series circuit 31 comprised of a condenser 32 and an inductance 34 having values such that they resonate at the beat frequency. The voltage appearing across a suitable portion of the inductance 34 is coupled through a capacitor 78 to an amplitude limiter 36, and the output of the limiter is coupled by a transformer 38 to a frequency modulation discriminator and detector 40. The sound signal recovered by the latter detector is suitably amplified by amplifier 42 and applied to a loud-speaker 44.

Other ways of extracting the beat frequency could be used. However, the series circuit 31 not only performs this function, but it also attenuates the amount of the beat frequency of 4.5 megacycles that reaches the control grid of the picture-reproducing device 16 and thus reduces the distortion that might otherwise be introduced by the beat frequency into the image formed by the picture reproducing device.

It will be realized that if, for reasons discussed above, the sound carrier is relatively strong, the amplitude of the beat frequency may become sufficiently strong to distort the image even in spite of the attenuation provided by the series circuit 31. Even more serious is the cross-talk produced by the heterodyning of the sound intermediate frequency with picture intermediate frequencies representing the fine detail in the picture.

The following description relates to the manner in which the present invention operates to prevent such distortion of the picture. As stated above, the amplification stage 10 produced at its output a relatively large amount of the sound carrier at the intermediate frequency level. In the arrangement shown, this output appears across a tuned plate load circuit comprised of an inductance 48 and a capacitance 50. In practice, capacitance 50 may consist partly or entirely of the distributed capacitance in shunt to inductance 48. An inductance 52 is magnetically coupled to the plate load inductance 48 and tuned to resonance at the sound carrier intermediate frequency by a parallel condenser 54. The circuit 48, 52 therefore forms a tuned trap circuit that is capable of absorbing energy of the sound intermediate carrier frequency from the output of the amplification stage 10. The degree of coupling between the plate load inductance 48 and the trap circuit inductance 52, as well as the quality factor, or Q, of the trap circuit, can be adjusted so that a relative amount of the sound carrier energy passed via any succeeding stages of the intermediate frequency amplifier to the second detector is set at a fixed value. However, the trap circuit operating by itself cannot, as pointed out above, control the ratio between the sound and video carrier strengths that reach the second detector in the presence of changes in the relative carrier strength at the receiver antenna 2.

In accordance with this invention, means are provided for controlling the amount of sound carrier energy absorbed by the tuned trap circuit as a function of the relative strength of the sound carrier. One way of obtaining such control is to vary the effective Q of the trap circuit, in accordance with the amplitude of the beat frequency between the audio and video carriers, by means of a variable shunt impedance. In the particular arrangement shown, the variable impedance comprises a diode 58. The plate of the diode is connected to one side of the trap circuit and its cathode is connected to the other side via two series-connected bypass condensers 60 and 62. The condensers have sufficiently high capacitance as to offer very little reactance to the sound intermediate frequency carrier currents flowing through them when the diode 58 is conducting. The junction of the condensers 60 and 62 is connected to a reference potential, here shown as ground. For reasons that will subsequently be explained, means are provided for biasing the diode 58 beyond cut-off in the absence of signal voltage. In the particular embodiment of the invention shown in the drawing, this means includes two resistors 64 and 66 connected in series between a suitable source of positive potential (not shown) and a point in the circuit that is at the reference potential. The cathode of the diode 58 is thereby maintained at a fixed positive potential with respect to ground by a connection to the junction of the resistors.

A control voltage that varies as a function of the amplitude of the beat frequency between the sound and video carriers is derived in a means to be described and is applied by a lead 70 to the other side of the trap circuit. This voltage reaches the plate of the diode 58 via the inductance 52 of the trap circuit. The bypass condensers 60 and 62 prevent appreciable intermediate frequency voltages from appearing on lead 70, and from appearing on the resistive network comprising resistors 64 and 66.

The control voltage to be applied to the lead 70 can be derived by separate means for detecting the beat frequency between the sound and video carrier and by rectifying the beat frequency itself with a non-linear device. However, separate circuits for performing these functions are not necessary as the second detector of the receiver is an adequate means for deriving the beat frequency, and the limiter 36 is a suitable means for deriving a unilateral voltage that varies with the amplitude of the beat frequency. As stated above, the beat frequency between the intermediate sound and video carriers appears across the inductance 34 of the series circuit 31 and is coupled to the limiter 36. In the illustrated example, the limiter 36 is comprised of a pentode 72 having its plate connected to a source of positive direct current potential via a primary 74 of the transformer 38 and a resistor 76. A coupling condenser 78 is connected between a suitable point in the inductance 34 and the control grid of the pentode, and a grid leak resistor 80 is connected between the grid and cathode. The time constant of the coupling condenser 78 and the grid leak resistor 80 is such that the pentode 72 acts as a grid-cathode limiter at the beat frequency between the sound and video carriers. A resistor 79 is connected between the cathode of the pentode and the reference potential so that a control voltage is developed across it that varies in accordance with the amplitude of the beat frequency. The lead 70 is connected to the cathode of the pentode so that the voltage appearing across resistor 79 may be applied to the plate of the diode 58.

The purpose of the invention is to control the relative maximum amplitude that may be attained by the sound and video intermediate frequency carriers at the input of the second detector. In the circuit described, only the amplitude of the sound intermediate frequency carrier is controlled in accordance with the amplitude of the beat frequency between these carriers. The amplitude of the beat frequency is not only a function of the relative amplitudes of the carriers but it is also a function of the amplitude level of both of the carriers. Hence, if no gain control, either manual or automatic, is exercised over the video carrier, the amplitude of the beat frequency can vary even if the relative amplitudes of the carriers as received is as desired. With no gain control, if the amplitude of the sound carrier is varied in response to changes in the amplitude of the beat frequency, the relative amplitudes of the carriers, although originally correct are changed to an undesired value. It is, therefore, assumed that some form of gain control, either manual or automatic is exercised over the video carrier. With gain control, any variation in the amplitude of the beat frequency between the carriers is a function of the changes in the amplitude of the sound carrier alone or in other words of the relative amplitudes of the carriers at the intermediate frequency level.

The over-all operation of the embodiment of the invention shown in the drawing is as follows:

In the absence of any beat frequency (4.5 megacycles in a receiver designed in accordance with present transmission standards) at the limiting device 36, the plate current flowing in the pentode 72 is at a maximum so as to produce a maximum positive voltage at its cathode and hence to apply maximum positive voltage to the plate of the diode 58. This voltage is adjusted relative to the fixed bias voltage on its cathode so as to make the diode conductive. Under these conditions the tuned trap circuit 52, 54 is effectively short-circuited and the amount of energy absorbed by the trap circuit from the output intermediate frequency amplifier stage 10 is negligible. Consequently, the receiver is at maximum sensitivity and ready for reception.

Assume now that television signals of increasing amplitude are received. The 4.5 megacycle beat frequency between the sound and video carriers becomes progressively stronger at the grid of the pentode 72. The biasing action of the condenser 78 and the resistor 80, progressively reduces the conduction of the pentode, and hence reduces the voltage applied to the plate of the diode 58, until the plate of the diode becomes so negative with respect to its cathode that it ceases to conduct. As the diode becomes less and less conductive, the trap circuit 52, 54 absorbs more and more energy in the region of the intermediate frequency sound carrier. Ultimately, when the diode ceases to conduct, the trap circuit absorbs a maximum amount of this energy.

The action just described prevents too large an amount of the sound carrier at the intermediate frequency level from reaching the second detector and hence prevents distortion of the image that would otherwise result from too strong a sound intermediate carrier signal. The voltage level at which the diode is switched to a non-conductive state can be easily adjusted by preselecting the value of the positive voltage applied to the cathode of the diode and the value of the resistor 79 in the cathode circuit of the pentode.

In describing my invention, I declare it to be my intention to cover all changes and modifications of the embodiment of the invention herein chosen for purposes of description, which do not constitute departures from the spirit and scope of the invention.

What I claim as new and desire to secure by Letters Patent of the U.S. is:

1. In a television receiver having an intermediate frequency amplifier coupled to a second detector, wherein aural intelligence is derived from the beat frequency produced in the second detector between a video carrier that is amplitude modulated in accordance with the video information and an aural carrier that is frequency-modulated in accordance with the aural information, electrical apparatus for selectively controlling the amount of aural carrier energy reaching the second detector comprising, in combination, a trap circuit coupled to said intermediate frequency amplifier so as to absorb energy in the frequency range of the aural carrier from said intermediate frequency amplifier, dampening means coupled to said trap circuit for damping the oscillations in said trap circuit, means coupled to the output of said second detector for deriving a voltage that is a function of the amplitude of the beat frequency between the two carriers, and means coupled between said latter means and said dampening means for controlling the amount of damping provided by said damping means inversely in accordance with the amplitude of said voltage.

2. In a television receiver adapted to reproduce images from an amplitude-modulated video carrier and audio intelligence from the beat frequency between a frequency-modulated audio carrier and the video carrier, the beat frequency being obtained in the second detector after the audio and video carrier have been amplified in a wide band amplifier, apparatus for controlling the amount of energy corresponding to the audio carrier that reaches the second detector comprising, in combination, means coupled to said wide band amplifier for absorbing energy corresponding to the audio carrier from said wide band amplifier, and means coupled between said latter means and said second detector for controlling the amount of energy absorbed by said latter means in response to the amplitude of the beat frequency appearing at the output of said second detector.

3. In an intercarrier sound television receiver adapted to operate in response to an amplitude-modulated video carrier and a frequency-modulated audio carrier, the combination of an intermediate frequency amplifier, said amplifier having at least one stage that is tuned to amplify the audio carrier at its intermediate frequency, a second detector, said second detector being coupled to the output of said intermediate frequency amplifier, a parallel resonant absorption trap tuned to the intermediate frequency of the audio carrier, said trap being coupled to said one stage of said intermediate amplifier so as to absorb energy therefrom, the energy thus absorbed being substantially of the audio carrier frequency, a variable resistive impedance coupled to said trap for varying the amount of energy absorbed by said trap, a tuned circuit coupled to the output of said second detector, said tuned circuit being adapted to develop a voltage in response to the beat frequency between the audio and video carriers that is produced by said second detector, and means coupled between said tuned circuit and said variable resistive impedance for controlling the resistance of said variable impedance in response to the voltage developed by said tuned circuit.

4. In an intercarrier sound television receiver adapted to operate in response to an amplitude-modulated video carrier and a frequency-modulated audio carrier, the combination of an intermediate frequency amplifier, said amplifier having at least one stage that is tuned to amplify the audio carrier at its intermediate frequency, a second detector, said second detector being coupled to the output of said intermediate frequency amplifier, a parallel-resonant absorption trap circuit tuned to the frequency of the intermediate frequency of the audio carrier, said trap circuit being coupled to said one stage of said intermediate amplifier so as to absorb energy therefrom, the energy thus absorbed being substantially of the intermediate frequency of the audio carrier, a first condenser, a second condenser and a diode connected in the order named so as to form a series circuit, the cathode of said diode being connected to said second condenser, said series circuit being coupled in parallel with said absorption trap, means for establishing the junction of said first and second condensers at a first predetermined reference potential, means for establishing the cathode of said diode at a second predetermined potential that is positive with respect to the reference potential, a condenser and an inductance connected in the order named so as to form a series resonant circuit between the output of said second detector and the junction between first and second condensers, said series resonant circuit being tuned to the beat frequency between the video and audio carriers that is derived by said second detector, an amplifier having at least a plate, a grid and a cathode, a resistive impedance connected between said cathode and the junction between said first and second condensers, a grid leak resistor connected between said grid and said cathode, a coupling condenser connected between a point on said inductance and said grid, the time constant of said coupling condenser and said grid leak resistor being long in comparison a cycle of said beat frequency so that said amplifier acts as a grid current limiter, and a direct current connection between the cathode of said amplifier and the plate of said diode.

5. The structure set forth in claim 3 wherein said variable resistive impedance comprises a unilateral conducting device.

References Cited in the file of this patent

UNITED STATES PATENTS 2,632,047 Schlesinger ------------ Mar. 17, 1953